(12) United States Patent
Sridhar et al.

(10) Patent No.: US 8,509,780 B2
(45) Date of Patent: Aug. 13, 2013

(54) METHOD AND APPARATUS FOR DETERMINING HANDOVER PARAMETERS IN WIRELESS OVERLAY NETWORKS

(75) Inventors: Kamakshi Sridhar, Plano, TX (US); Hajo Bakker, Eberdingen (DE)

(73) Assignee: Alcatel Lucent, Paris (FR)

( * ) Notice: Subject to any disclaimer, the term of this patent is extended or adjusted under 35 U.S.C. 154(b) by 42 days.

(21) Appl. No.: 13/212,897

(22) Filed: Aug. 18, 2011

(65) Prior Publication Data

US 2013/0045749 A1   Feb. 21, 2013

Related U.S. Application Data

(60) Provisional application No. 61/523,627, filed on Aug. 15, 2011.

(51) Int. Cl.
*H04W 36/00* (2009.01)

(52) U.S. Cl.
USPC .......... 455/436; 455/41.2; 455/437; 455/438; 455/439; 455/442; 455/443; 455/444; 455/450; 455/452.1; 455/452.2; 455/453; 455/552.1; 455/553.1; 370/310.2; 370/328; 370/331; 370/332; 370/333; 370/334; 370/338

(58) Field of Classification Search
USPC ................. 455/436, 437, 438, 439, 442, 443, 455/444, 450, 452.1, 0.2, 453, 41.2, 552.1, 455/553.1, 41.3; 370/310.2, 328, 331–334, 370/338
See application file for complete search history.

(56) References Cited

U.S. PATENT DOCUMENTS

| | | | |
|---|---|---|---|
| 4,670,899 A * | 6/1987 | Brody et al. | 455/453 |
| 6,507,740 B2 * | 1/2003 | Shi | 455/437 |
| 7,596,376 B2 * | 9/2009 | Calhoun et al. | 455/436 |
| 7,804,797 B2 * | 9/2010 | Mori et al. | 370/318 |
| 2010/0040019 A1 * | 2/2010 | Tinnakornsrisuphap et al. | 370/331 |
| 2010/0142486 A1 * | 6/2010 | Wahlqvist et al. | 370/332 |

FOREIGN PATENT DOCUMENTS

| | | |
|---|---|---|
| GB | 2 474 503 A | 4/2011 |
| WO | WO 2009 007720 | 1/2009 |
| WO | WO 2009 025494 | 2/2009 |

OTHER PUBLICATIONS

3rd Generation Partnership Project;Technical Specification Group Radio Access Network; Evolved Universal Terrestrial Radio Access Network (E-UTRAN);X2 application protocol (X2AP) (Release 10); 3GPP TS 36.423 V10.2.0(Jun. 2011).
International Search Report PCT/US2012/050519 dated Oct. 10, 2012.
Written Opinion dated Oct. 10, 2012.

* cited by examiner

*Primary Examiner* — Steve D Agosta
(74) *Attorney, Agent, or Firm* — Williams, Morgan & Amerson

(57) ABSTRACT

The present application describes embodiments of a method and apparatus for determining handover parameters in a wireless overlay network. One embodiment includes modifying a bias value used to determine when to handover user equipment between a macrocell and a femtocell that overlays the macrocell. The bias value is modified in response to a change in one or more handover frequencies associated with the user equipment. Handovers of user equipment are triggered when a sum of the bias value and a measured value of the femtocell signal strength exceed a measured value of the macrocell signal strength.

7 Claims, 3 Drawing Sheets

METHOD AND APPARATUS FOR DETERMINING HANDOVER PARAMETERS IN WIRELESS OVERLAY NETWORKS

CROSS REFERENCE TO RELATED APPLICATIONS

This application claims priority to U.S. Provisional Patent Application 61/523,627, filed on Aug. 15, 2011.

BACKGROUND

This invention relates generally to communication systems, and, more particularly, to wireless communication systems.

Wireless communication systems typically deploy numerous base stations (or other types of wireless access points such as eNodeBs) for providing wireless connectivity to mobile units (or other types of user equipment). Each base station is responsible for providing wireless connectivity to the mobile units located in a particular cell or sector served by the base station. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers or femtocells because they are intended to provide wireless connectivity to a micro-cell (or femtocell) that encompasses a residence. However, the functionality in a home base station router is typically quite similar to the functionality implemented in a conventional base station router that is intended to provide wireless connectivity to a macro-cell that may cover an area of approximately a few square kilometers. One important difference between a home base station router and a conventional base station router is that home base station routers are designed to be plug-and-play devices that can be purchased off-the-shelf and easily installed by a lay person. Deployment of home base station routers may result in a very large number of femtocells, which may overlap with or be encompassed by one or more macro-cells.

Mobile units may be handed off from one base station to another as the mobile units roam throughout the wireless communication system. Mobile units may also be handed off from a macrocellular base station to a home base station router or femtocell, even when the coverage area of the base station completely encompasses the coverage area of the femtocell. For example, a user's mobile unit may hand off to a home base station router when the user returns home from work. From the point of view of the user, robust handover techniques are critical for supporting seamless service as the mobile unit moves around. Users quickly become frustrated by gaps or silences in voice communication that may be caused by latency in the handover process. Some users may even switch providers if calls are frequently dropped when the user roams from one cell to another.

The basic condition for initiating a handover is that the signal strength from the candidate target base station or cell is stronger/better than the signal strength from the current serving base station or cell. However, simply handing off a mobile unit as soon as the target base station appears to have a stronger signal than the serving base station can lead to a number of problems. For example, the signal strengths near the boundaries between a serving cell and its neighbor cells are (almost by definition) nearly equal. The signal strength received by each mobile unit near a boundary is therefore approximately equal and relatively small deviations can cause the relative signal strengths to flip-flop. The strength of the signals received by a particular mobile unit may also vary rapidly due to movement of the mobile unit and/or environmental changes. Consequently, the mobile unit may be rapidly handed back and forth (a phenomenon known as ping-ponging) if the hand off is performed based only on the relative signal strength. Ping-ponging consumes valuable overhead unnecessarily, degrades the perceived call quality, and can even lead to dropped calls.

Furthermore, the signal strength provided by a home base station router in its corresponding femtocell may not exceed the signal strength provided by a macrocellular base station at any point within the femtocell, particularly if the home base station router is deployed relatively close to the base station. In this situation, mobile units would never handoff to the femtocell if handoff was only triggered when signal strength provided to the mobile unit by the femtocell was larger than the signal strength provided by the macrocell. Consequently, femtocells would be nearly useless when deployed in areas that receive strong macrocellular signals. Handover to femtocells may therefore be triggered when the sum of a bias value and the signal strength received by the mobile unit from the femtocell is larger than the signal strength received from the macrocell. For example, the bias value may be set to 2 dB so that handover to the femtocell can be triggered when the femtocell signal strength is 2 dB less than the macrocell signal strength.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for determining handover parameters in a wireless overlay network. One embodiment includes modifying a bias value used to determine when to handover user equipment between a macrocell and a femtocell that overlays the macrocell. The bias value is modified in response to a change in one or more handover frequencies associated with the user equipment. Handovers of user equipment are triggered when a sum of the bias value and a measured value of the femtocell signal strength exceed a measured value of the macrocell signal strength.

In another embodiment, a wireless communication node is provided for determining handover parameters in a wireless overlay network. One embodiment of the wireless communication node is configured to modify a bias value used to determine when to handover user equipment between nodes that have overlaying coverage areas. The bias value is modified in response to a change in one or more handover frequencies associated with the user equipment. Handovers of user equipment are triggered when a sum of the bias value and a measured value of the femtocell signal strength exceed a measured value of the macrocell signal strength.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
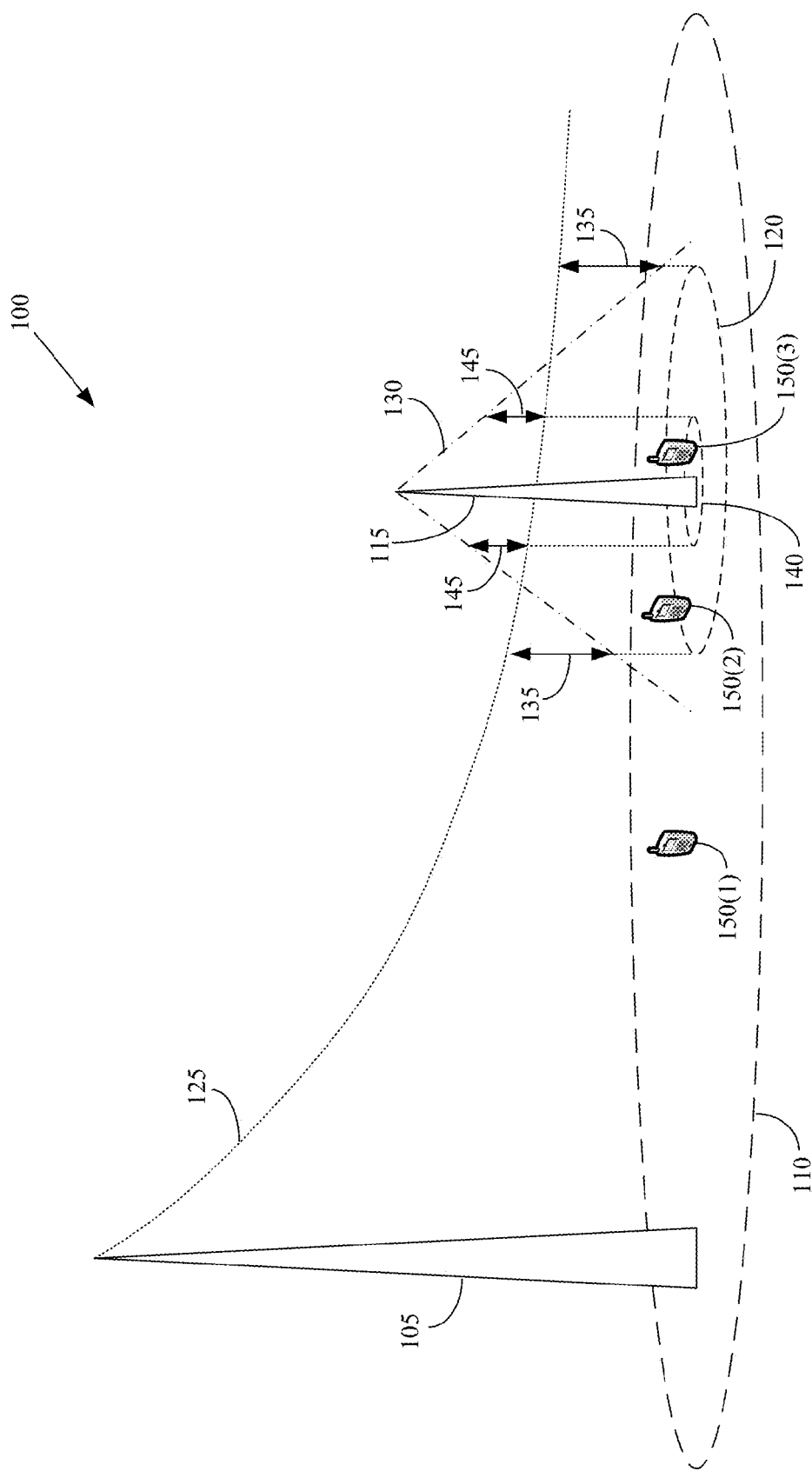
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Femtocells, home base station routers, picocells, and other "small cell" devices are typically deployed in an overlay configuration so that the femtocells overlap with macrocellular coverage. At least in part because of the small size of the femtocell, users in the femtocell may frequently pass back and forth across the femtocell/macrocell boundary, which may be determined at least in part by a bias offset between the macrocell signal strength and the femtocell signal strength. Handovers of user equipment from the macrocell to the femtocell are triggered when a sum of the bias value and a measured value of the femtocell signal strength at the user equipment exceeds a measured value of the macrocell signal strength at the user equipment. Frequent handoffs generate significant, and often unnecessary, signaling load within the network. For example, handovers between the macrocells and femtocells may generate significant signaling load on the X2 interface between the base stations serving the macrocells and the femtocells. The present application describes embodiments of techniques for modifying the size of the femtocell depending on measures of the frequency of handovers into and/or out of the femtocell. In one embodiment, the bias value used to determine when to hand off user equipment between a macrocell and a femtocell is increased in response to an increase in at least one handover frequency associated with the user equipment.

FIG. 1 conceptually illustrates one exemplary embodiment of a wireless communication system 100. In the illustrated embodiment, the wireless communication system 100 includes one or more base stations 105 that provide wireless connectivity within a coverage area 110. The coverage area 110 may extend to relatively large distances, e.g., the coverage area 110 may be characterized by a radius of several kilometers. The base station 105 operates according to one or more cellular standards and/or protocols and may be referred to as a macrocellular base station. For example, the base station 105 may operate according to the Long Term Evolution (LTE) of the standards and/or protocols defined by the Third Generation Partnership Project (3GPP). However, persons of ordinary skill in the art having benefit of the present disclosure should appreciate that in alternative embodiments the base station 105 may operate according to other standards and/or protocols.

The wireless communication system 100 also includes one or more femtocells 115 that provide wireless connectivity within a coverage area 120. The coverage area 120 of the femtocell 115 may be smaller than the coverage area 110. For example, the coverage area 120 may be characterized by a radius of several meters so that the coverage area 120 can correspond to the boundaries of a home or office building. However, persons of ordinary skill in the art having benefit of the present disclosure should appreciate that the size of the coverage area 120 of the femtocell is a matter of design choice. The femtocell 115 may operate according to various standards and/or protocols. For example, the femtocell 150 may operate according to the IEEE 802.11, IEEE 802.15, Wi-Fi standards, or other wireless communication standards and/or protocols.

The coverage areas 110, 120 may be determined by signal strengths 125, 130 of signals transmitted by the base station 110 and/or femtocell 115. In the illustrated embodiment, the boundaries of the coverage area 110 are determined the signal strength 125 such that the outer boundary of the coverage area 110 corresponds to a threshold value of the signal strength 125. For example, the outer boundary of the coverage area 110 may be defined by a pilot signal strength 125 falling below a threshold value, e.g., as measured by user equipment at the boundary. The boundaries of the coverage area 120 may be determined using the macrocell signal strength 125, bias values 135, and the femtocell signal strength 130. In the illustrated embodiment, the outer boundary of the coverage area 120 corresponds to locations where the macrocell signal strength 125 is equal to the sum of the femtocell signal strength 130 and the bias value 135. The coverage area 120 may also be subdivided to include an inner region 140. The boundary of the inner region 140 corresponds to locations where the femtocell signal strength 130 is equal to the sum of the macrocell signal strength 125 and a cell border window bias 145.

The base station 105 and/or the femtocell 115 may be configured using parameters provided by operations, administrations, and maintenance (OAM) functionality in the wireless communication system 100. In the illustrated embodiment, the base station 105 and the femtocell 115 are configured in accordance with 3GPP Rd-10 standards, which have defined the parameters needed to configure LTE small cells. In one embodiment, the small cell specific settings may be configured and downloaded to the femtocell 115 through the OAM functionality and the base station 105. These settings may include the values for the cell border window bias 145 and the bias 135. These settings may also include the patterns for almost blank subframes (ABS), which are subframes during which the base station 105 bypasses or turns off transmission of data traffic to reduce intercell interference within the coverage area 120 served by the femtocell 115.

In the illustrated embodiment, the coverage areas 110, 120 overlay each other. As used herein, the term "overlay" indicates that a least a portion of the coverage area 110 is the same as (e.g., overlaps or overlies) a portion of the coverage area 120. One overlying coverage area 120 may be completely encompassed by another overlying coverage area 110. However, this is not required and in alternative embodiments only a portion of one of the overlying coverage area 120 may overlap a portion of the overlying coverage area 110. User equipment 150 may access the wireless communication system 100 using either the base station 105 and/or the femtocell 115, depending on the location of the user equipment 150. For example, user equipment 150(1) is in the coverage area 110 but is not in the coverage area 120. The user equipment 150(1) may therefore access the wireless communication system 100 via the base station 105. For another example, user equipment 150(2-3) are in the coverage areas 110, 120 and may therefore access the wireless communication system 100 using either the base station 105 or the femtocell 115. User equipment 150 may be handed over when they cross the boundaries between the cell coverage areas 110, 120. Alternatively, user equipment 150 may be handed over for other purposes such as load balancing.

Movement in and out of the femtocell coverage area 120 may generate frequent handovers between the base station 105 and the femtocell 115 for the same user equipment 150. In this case, it may be desirable to widen the coverage area 120 to include as much area as is acceptable (within the capacity of the femtocell 115) so that user equipment 150 remain within the coverage area 120 and hence may not make unnecessary handovers to the base station 110. The frequency of handovers between macro/small cells 105, 115 can be monitored and the wireless communication system 100 may respond to an increase in the handover frequency by increasing the coverage area 120 to cover user equipment 150 that are moving in and out of the coverage area 120. Increasing coverage of the femtocells 115 may allow more user equipment 150 to be supported by the wireless communication system 100 as long as the total number of user equipment is less than the maximum capacity as determined by the maximum number of active user equipment 150. In one embodiment, the maximum capacity may be determined in part by the number of ABS frames that can be supported by the base station 105 and/or the femtocell 115. Further, as soon as the number of user equipment 150 within the coverage area 120 falls to below certain threshold, the coverage area 120 may be reduced.

In one embodiment, the coverage area 120 can be modified by modifying the bias value 135. For example, an increase in the bias value 135 may be triggered when the frequency of handovers between the base station 105 and the femtocell 115 increases beyond a threshold. Increasing the bias value 135 may reduce the frequency of handovers from the base station 105 to the femtocell 115 (and vice versa), which may improve overall system performance at least in part because handovers could potentially result in radio link failures and hence call drops. In one embodiment, the total number of user equipment 150 in the coverage area 120 may be continuously monitored and when the number of user equipment 150 falls below a certain lower threshold value, then the coverage may be reduced by reducing the bias value 135.

Figure 2:
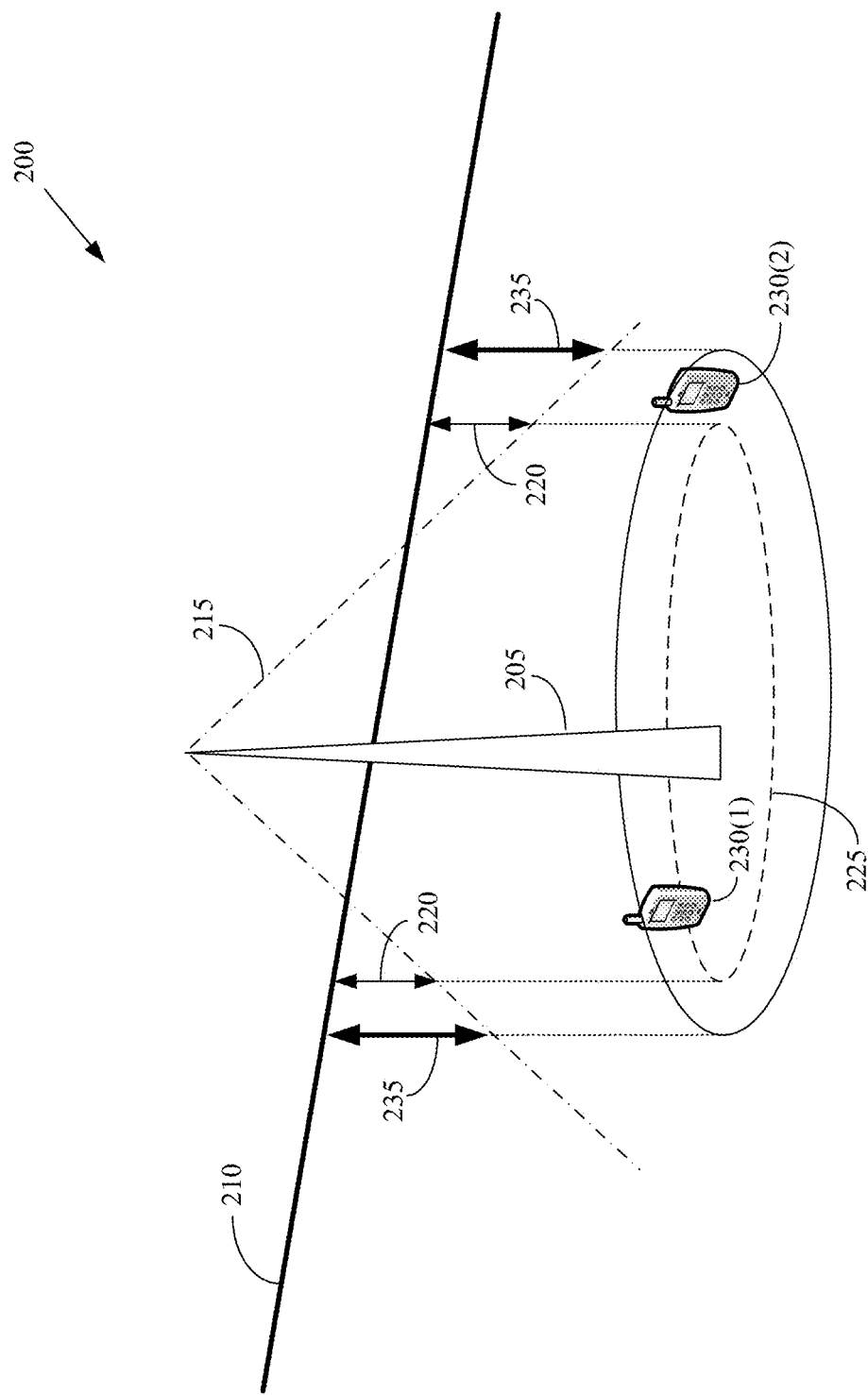
FIG. 2 conceptually illustrates another exemplary embodiment of a wireless communication system.

FIG. 2 conceptually illustrates another exemplary embodiment of a wireless communication system 200. In the illustrated embodiment, an access node 205 provides a signal strength 210 that is used to support wireless connectivity according to one or more wireless standards and/or protocols. The access node 205 overlays a coverage area of a macrocellular access node (not shown in FIG. 2) that provides a signal strength 215 for supporting wireless connectivity according to one or more cellular standards and/or protocols. Coverage provided by the access node 205 can be varied or modified by changing a bias value. For example, a bias value 220 may initially be assigned to the access node 205. The sum of the bias value 220 and the signal strength 215 may then be compared to the threshold value determined by the signal strength 210 to set the initial boundary of the coverage area 225. In the illustrated embodiment, user equipment 230(1) is within the coverage area 225 and may therefore receive wireless connectivity using the access node 205. However, user equipment 230(1) is near the boundary of the coverage area 225 and may frequently handover to the macrocellular coverage, e.g., due to movement of the user equipment 230(1), changing environmental conditions, and the like.

If the handover frequency associated with the user equipment 230(1) exceeds a threshold value, coverage of the access node 205 may be increased. In the illustrated embodiment, coverage may be increased by increasing the bias to a new bias value 235 that is larger than the initial bias value 220. The resulting coverage area 240 is larger than the coverage area 225. In the illustrated embodiment, user equipment 230(1) is further from the outer boundary of the coverage area 240 and may therefore be less likely to handover to the macrocellular coverage, which may decrease the handover frequency. Moreover, user equipment 230(2) may now be included in the coverage area 240 of the access node 205. In one embodiment, the coverage area of the access node 205 may also be reduced. For example, the coverage may be reduced from the coverage area 240 to the coverage area 225 by decreasing the bias value from the bias 235 to the bias 220. The coverage of the access node 205 may be reduced when the number of users associated with or served by the access node 205 drops below a threshold value. This threshold value may correspond to the number of users that can be served by the macrocellular coverage without assistance from the access node 205.

Figure 3:
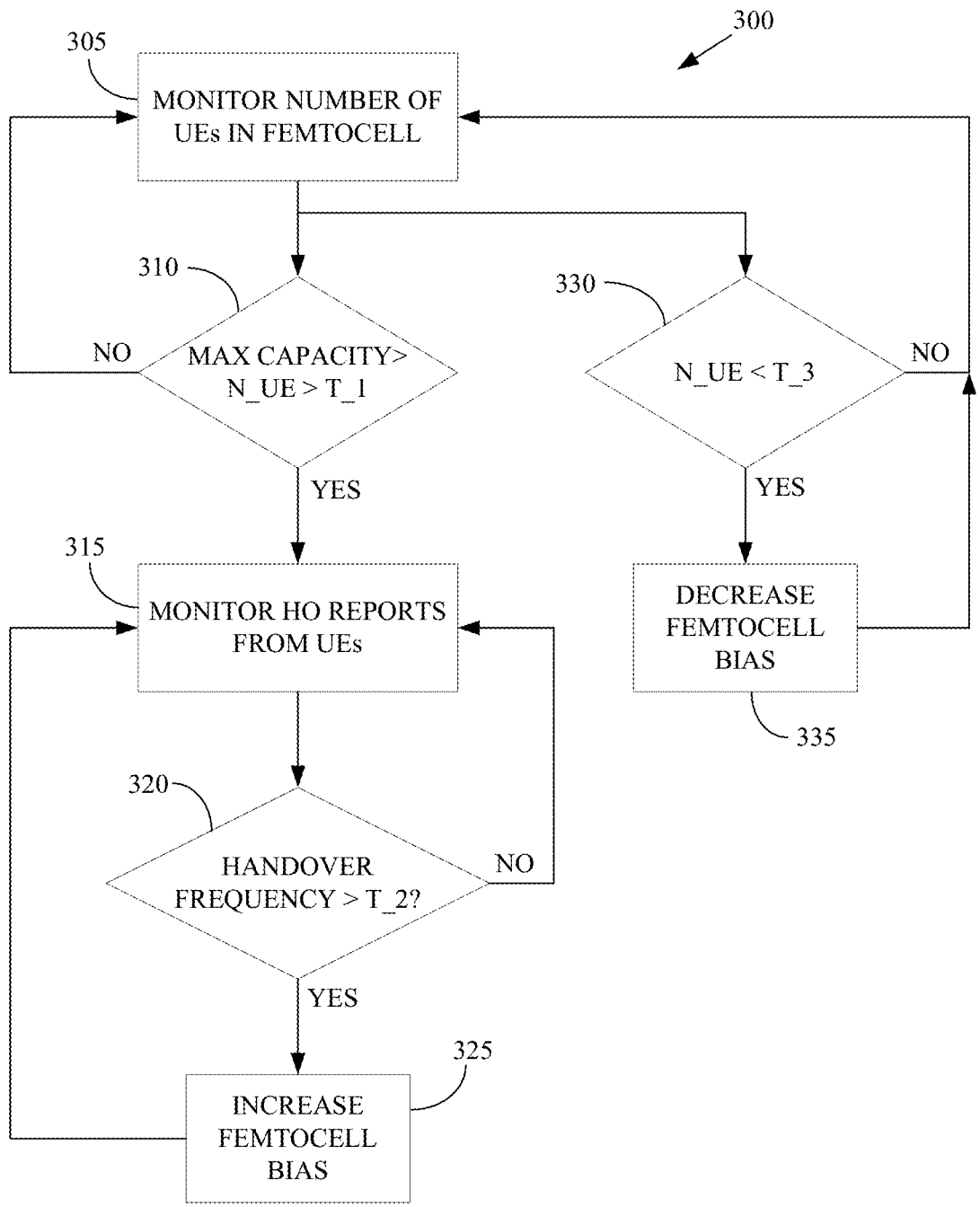
FIG. 3 conceptually illustrates one exemplary embodiment of a method of determining handover (HO) parameters for user equipment in an overlay network configuration.

FIG. 3 conceptually illustrates one exemplary embodiment of a method 300 of determining handover (HO) parameters for user equipment in an overlay network configuration. The overlay network configuration includes one or more femtocells that overlay one or more macrocells. In the illustrated embodiment, the number of user equipment in a femtocell is monitored (at 305). For example, the number of user equipment in the femtocell may be monitored (at 305) substantially continuously, at predefined intervals, or in response to particular events. The femtocell may then determine (at 310) whether or not the current number of user equipment is greater than a first threshold (T_1). The femtocell may also determine (at 310) whether or not the current number of user equipment in the femtocell is less than the maximum capacity of the femtocell. When the number of user equipment is less than the first threshold, the femtocell may continue to monitor (at 305) the total number of user equipment in the femtocell.

If the number of user equipment exceeds the first threshold, the femtocell may monitor (at 315) information indicating handovers of user equipment between the femtocell and the macrocell. In the illustrated embodiment, the femtocell monitors (at 315) handoff reports received from user equipment served by the femtocell. The femtocell may then determine (at 320) a handover frequency (or some other measure or characteristic indicative of a handover frequency) for user equipment associated with the femtocell. For example, the handover frequency may be the frequency that one user equipment hands off between the femtocell and the macrocell. Alternatively, the handover frequency may be a statistical measure of handover frequencies for a group of user equipment that hand off between the femtocell and the macrocell. As long as the handover frequency (or measure thereof) does not exceed (at 320) a second threshold (T_2), the femtocell may continue to monitor (at 315) the handoff reports.

In one embodiment, the frequency of handovers can be determined (at 320) through standards based mechanisms by noting the details in the request to handover user equipment from the source to the target cell. This request may include, in addition to other information, the 'UE History Information' list for the user equipment. For example, the UE History Information information element (IE) defined by the 3GPP Technical Specification 36.423 contains information about cells that the user equipment has been served by in the active state prior to the target cell.

TABLE 1

Last Visited Cell Information

| IE/Group Name | Presence | Range | IE type and reference | Semantics description | Criticality | Assigned Criticality |
|---|---|---|---|---|---|---|
| Last Visited Cell List | | 1 . . . <maxnoofCells> | | Most recent information is added to the top of this list | — | — |
| >Last Visited Cell Information | M | | 9.2.39 | | — | — |

| Range bound | Explanation |
|---|---|
| maxnoofCells | Maximum number of last visited cell information records that can be reported in the IE. Value is 16. |

Table 1 shows an information element that indicates the Last Visited Cell Information, which may contain E-UTRAN or UTRAN or GERAN cell specific information.

TABLE 2

Last Visited E-UTRAN Cell Information

| IE/Group Name | Presence | Range | IE type and reference | Semantics description | Criticality | Assigned Criticality |
|---|---|---|---|---|---|---|
| CHOICE Last Visited Cell Information | M | | | | — | — |
| >E-UTRAN Cell | | | | | — | — |
| >>Last Visited E-UTRAN | M | | 9.2.40 | | — | — |

TABLE 2-continued

Last Visited E-UTRAN Cell Information

| IE/Group Name | Presence | Range | IE type and reference | Semantics description | Criticality | Assigned Criticality |
|---|---|---|---|---|---|---|
| Cell Information |  |  |  |  |  |  |
| >UTRAN Cell |  |  |  |  |  |  |
| >>Last Visited UTRAN Cell Information | M |  | OCTET STRING | Defined in TS 25.413 [24] | — | — |
| >GERAN Cell |  |  |  |  |  |  |
| >>Last Visited GERAN Cell Information | M |  | 9.2.41 |  | — | — |

Table 2 shows information elements that indicate the Last Visited E-UTRAN Cell Information, which may contain information about a cell that is to be used for RRM purposes.

TABLE 3

Time UE Stayed in Cell

| IE/Group Name | Presence | Range | IE type and reference | Semantics description | Criticality | Assigned Criticality |
|---|---|---|---|---|---|---|
| Global Cell ID | M |  | ECGI 9.2.14 |  | — | — |
| Cell Type | M |  | 9.2.42 |  | — | — |
| Time UE stayed in Cell | M |  | INTEGER (0 . . 4095) | The duration of the time the UE stayed in the cell in seconds. If the UE stays in a cell more than 4095 s, this IE is set to 4095 | — | — |

Table 3 shows information elements that indicate the time the user equipment stayed in a particular cell. This information element can be used to determine the duration the UE stayed in a given cell as specified by PCI. Therefore, looking at the how long each UE stayed within each cell (contained within the HO request for UEs that are moving in and out) indicates whether the rate of HOs has increased. Thus, the femtocell can track durations, of say 10 seconds, to determine the user equipment mobility patterns and hence the track whether the user equipment is going in and out of the femtocell frequently. Handover from the macrocell to the femtocell may follow the same mechanism as the handover from femtocell to the macrocell. However, persons of ordinary skill in the art, having benefit of the present disclosure, should appreciate that alternative techniques for determining the handover frequency may also be used. For example, the femtocell may keep track of handovers performed by each user equipment and use a timestamp or similar technique to compute the handover frequency using this information.

When the frequency of handovers between the femtocell and the macrocell exceeds a threshold (T_2), the bias value for the femtocell may be increased (at 325) to increase the coverage area of the femtocell, as discussed herein. For example, the bias may be increased (at 325) until the number of users in the femtocell has reached a certain maximum limit and/or until the number or frequency of handovers has been reduced below the threshold (T_2). The reduction in the number of handovers may be detected by checking the history list in the HO procedure to determine whether the rate of handover has been reduced.

In the illustrated embodiment, the number of users in the femtocell may also be monitored (at 305) to determine (at 330) when the total number of users in the small cell falls below a certain minimum threshold (T_3). Determining (at 330) when the total number of users in the small cell has fallen may be done in parallel and/or concurrently with determining whether the number of users has exceeded the first threshold (T_1). The threshold T_3 is lower than the threshold T_1 so that the criteria 310, 330 are not satisfied for the same number of users. The bias may be reduced (at 335) to decrease the femtocell coverage area when the number of users falls below the threshold T_3. Reducing the size of the coverage area in this circumstance may be advantageous because it no longer may be necessary to have a large femtocell coverage area. Macrocellular users may therefore continue to be served by the macrocell.

The macrocell and the femtocell should be coordinated or synchronized to use the same bias value. Synchronizing the bias value between the macrocell and the femtocell may help coordinate handovers between the macrocell and the femtocell at the same position and may help avoid additional unwanted ping-ponging handovers that can be caused by an unsymmetrical setting of the bias value. Thus, when the bias value is determined by the macrocell or the femtocell, the bias-determining entity signals the other entity and they negotiate or perform a handshaking protocol to synchronize the bias values to the determined bias value. For example, an increase or decrease of the bias value can be communicated by the femtocell (i.e., the initiating cell in this case) towards the macro cell. In various embodiments, the message(s) used to synchronize the femtocell and the macrocell bias values may include a vendor specific 'private X2 message' or a new X2 message, which would require a specification by 3GPP.

One embodiment of this concept is applicable for a single carrier solution, i.e. both the macro and small cell are operating on the same frequency. In alternative embodiments for a multi carrier solution, the small cell might increase or decrease its overall transmission power, or the transmission power for a particular signal such as a pilot or reference signal, for extension or reduction of its coverage.

Modification of bias values in response to frequency of handovers occurring between macro cells and small cells and vice versa may reduce overhead in wireless communication systems. For example, through embodiments of the mechanisms described herein, the frequency of unnecessary handovers from macro cells to small cells and vice-versa can be reduced, thus significantly reducing the possibility of radio link failure and eventual call drops. Existing solutions do not consider any solution to this problem.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   monitoring a number of user equipment associated with the femtocell;
   determining whether the number of user equipment associated with the femtocell exceeds a first threshold;
   monitoring handover reports associated with handovers of user equipment between the macrocell and the femtocell in response to determining that the number of user equipment associated with the femtocell exceeds a first threshold and is less than a maximum allowable capacity of the femtocell; and
   modifying a bias value used to determine when to handover user equipment between a macrocell and femtocell that overlays the macrocell, wherein the bias value is modified in response to a change in at least one handover frequency associated with said user equipment, and wherein handovers of user equipment are triggered when a sum of the bias value and a measured value of the femtocell signal strength exceed a measured value of the macrocell signal strength, wherein modifying the bias value comprises increasing the bias value when information in the handover reports indicates that said at least one handover frequency has exceeded a second threshold.

2. The method of claim 1, wherein modifying the bias value comprises increasing the bias value in response to an increase in said at least one handover frequency.

3. The method of claim 1, comprising modifying the bias value at the macrocell or the femtocell and synchronizing the bias values used by the macrocell and the femtocell to the modified bias value.

4. The method of claim 1, comprising reducing the bias value when the number of user equipment associated with the femtocell is less than a third threshold, wherein the third threshold is less than the first threshold.

5. A wireless communication node comprising either a macrocell or a femtocell configured to:
   monitor a number of user equipment associated with the femtocell;
   determine whether the number of user equipment associated with the femtocell exceeds a first threshold;
   monitor handover reports associated with handovers of user equipment between the macrocell and the femtocell in response to determining that the number of user equipment associated with the femtocell exceeds a first threshold and is less than a maximum allowable capacity of the femtocell;
   modify a bias value used to determine when to handover user equipment between nodes overlying coverage areas, wherein the bias value is modified in response to a change in at least one handover frequency associated with said user equipment, and wherein handovers of user equipment are triggered when a sum of the bias value and a measured value of a signal strength from one of the overlying nodes exceeds a measured value of a signal strength from at least one other overlying node, wherein the wireless communication node is configured to increase the bias value when information in the handover reports indicates that said at least one handover frequency has exceeded a second threshold; and
   synchronize the bias values used by the macrocell and the femtocell to the modified bias value.

6. The wireless communication node of claim 5, wherein the wireless communication node is configured to modify the bias value in response to an increase in said at least one handover frequency.

7. The wireless communication node of claim 5, wherein the wireless communication node is configured to reduce the bias value when the number of user equipment associated with the femtocell is less than a third threshold, wherein the third threshold is less than the first threshold.

* * * * *